May 8, 1951 G. V. WOODY ET AL 2,551,820
EXTRACTION COLUMN
Filed Aug. 29, 1947

Inventors
Guy V. Woody
Charles W. Bilbe
by William S. Gates
Attorney

UNITED STATES PATENT OFFICE 2,551,820

EXTRACTION COLUMN

Guy V. Woody, Milwaukee, and Charles W. Bilbe, Wauwatosa, Wis., assignors to Allis-Chalmers Manufacturing Company, Milwaukee, Wis., a corporation of Delaware Application August 29, 1947, Serial No. 771,218

7 Claims. (Cl. 23—270)

This invention relates to solvent extraction columns, leaching devices and the like, in which solid materials are moved by gravity, countercurrent, through a treating fluid.

Many devices are known to the prior art, in which solid materials are fed to the top of a vertical, tube-like column with arrangements for moving the solid materials slowly downward through the column and discharging same from the bottom while passing a current of solvent liquid, or other treating or leaching fluid, upwardly through the column and discharging the same from a level near the top substantially free of solid particles.

The present invention has for an object the improvement of apparatus of the above described general character and more particularly of the structure of the upper end of the column and arrangements therein for continuously discharging solvent or treating fluid with dissolved materials, substantially free of solids, while continuously feeding solids from above through the zone of fluid discharge.

More particularly, the invention concerns structure including an annular settling zone of gradually enlarging cross-sectional area extending from a feeding level upwardly to an annular decanting lip, combined with structure for substantially sealing the top of the column above the decanting level and providing for the continuous feeding of solid materials downwardly through the settling zone to the feeding level.

One specific feature concerns the construction of an annular settling zone section at the top of the column with flow controlling baffles in the settling zone section supporting a feed tube extending from above to below the settling zone.

Another specific feature concerns a simple improved device for continuously feeding loose materials to the column, mixing and inundating them in the solvent used, and maintaining a material seal above the mixing and wetting level to obstruct the entrance of air and escape of vapors to and from the column through the feeding openings.

The invention having the above and other features, residing in the structure of the specific embodiment described hereinbelow, can be carried into practical effect as described and illustrated herein with reference to the accompanying drawings, in which.

Figure 2:
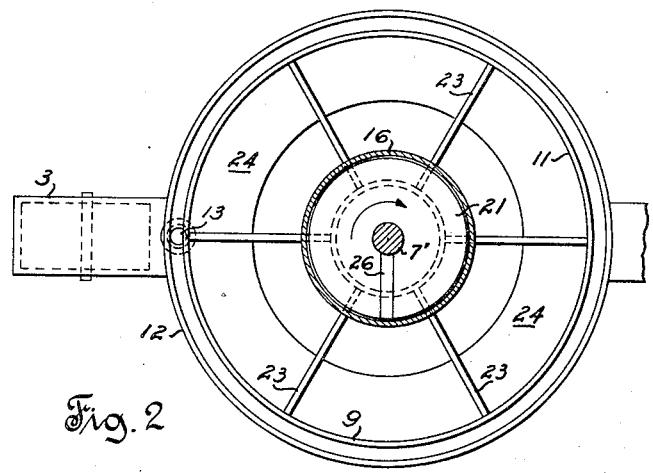
Fig. 2 is a cross-sectional view taken on line II—II of Fig. 1.
Figure 1:
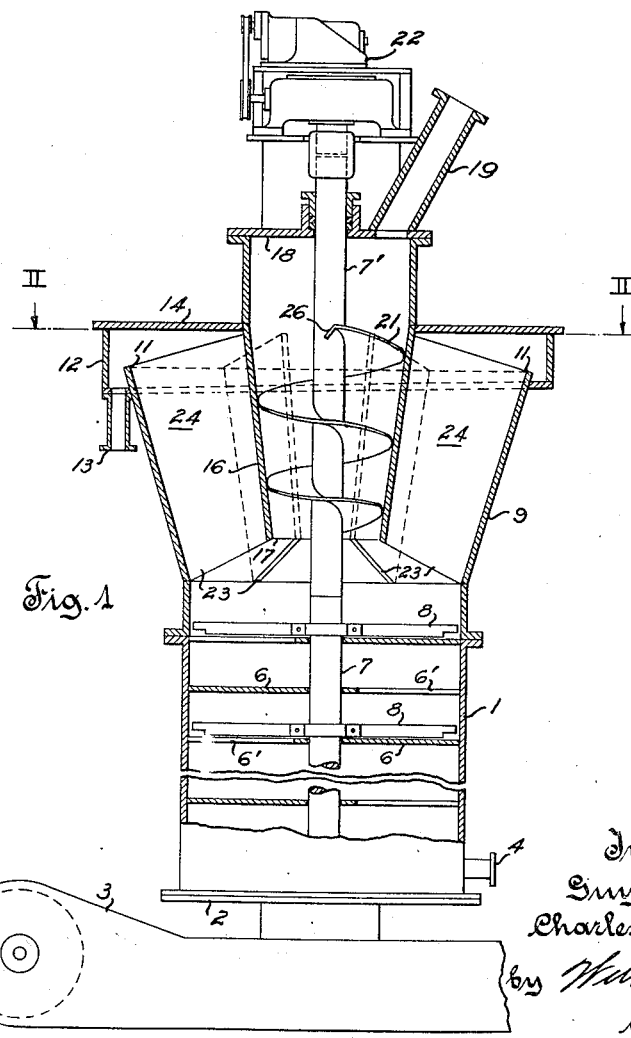
Fig. 1 is a vertical sectional view of an extractor column involving the present invention.

The vertical column extraction device shown in the drawing consists of a generally cylindrical main shell 1 closed at its bottom end by a plate 2 and a discharge conveyor housing 3 of known type suitable for removing solids from the shell 1 and conveying same away to a spent material handling system. A solvent inlet pipe 4, near the lower end of the shell 1, provides for admission of liquid solvent, such as gasoline, hexane, etc., or any other known fluid capable of dissolving oils, soluble salts or other soluble materials desired to be extracted from vegetable, animal or mineral, raw materials, press cake, etc. entering the upper end of shell 1 and descending by gravity through the ascending column of solvent. The apparatus shown is intended primarily for treatment of solid particles which will sink or settle in the mixture of solvent and dissolved matter. A number of horizontal baffle plates 6 having openings 6' are provided to impede the passage of solid particles downwardly through the shell 1. A vertical shaft 7 is rotatably mounted coaxially within shell 1 and is provided with radial arms 8 which sweep the upper surfaces of plates 6, agitating the materials thereon and continuously pushing particles into a position to fall by gravity through openings 6', which are staggered from plate to plate so as to break the descent of the solid particles.

The foregoing structure is known to the prior art and those skilled in the art of solvent extraction, and constitutes no part of the present invention except by virtue of its special relationship to and combination with structural features described hereinbelow.

At the top of main shell 1 a top shell section 9 is provided, forming an upward extension of shell 1 which takes the form of a frusto-conical shell flaring upwardly to terminate in an annular decanting lip 11 arranged, preferably, in a horizontal plane.

Surrounding the top of the shell section 9 is a trough-like member 12 having a fluid discharge fitting 13 arranged to be connected with a conduit (not shown) for carrying away fluids which overflow lip 11.

Trough member 12 is enclosed by a fluid-tight cover plate 14 having a central tubular portion 16 tapering downwardly to terminate at its lower and smaller end in a horizontal plane as at 17, and extending upwardly to a fluid-tight feed tube cover plate 18 with a fitting 19 for connection with a source of the comminuted solid raw material from which the desired compounds, (oils, salts, etc.) are to be extracted. An upper shaft section 7', forming a part of, or connected in aligned driving relation to shaft 7, carries a helical screw fin or blade 21 which fits rotatably within the tubular portion 16 of cover plate 14 and extends from a level above the level of lip 11 downwardly to the level of the lower and smaller end 17 of the tube 16, which may be considered as establishing the solids feed level, or the level where solids leave the influence of the screw blade or fin 21 to descend under the influence of gravity and fluid currents within main shell 1. The upper end of shaft 7' may be connected, in any suitable known manner, with a power drive unit 22 which may be carried by cover plate 18, that is, by the vapor housing which includes parts 12, 13, 14, 16, 18 and 19.

The feed tube 16 is preferably supported, with relation to shell section 9, by structural baffle plates 23, which are arranged to connect the external surface of the tubular feed tube portion 16 with the shell section 9. These structural plates 23 preferably are arranged in vertical planes radial to the shell and angularly spaced equally about tube 16. Plates 23 will act to locate the tube 16 relative to the shell and to divide the settling zone 24, that is, the annular space within shell 9 and external to feed tube portion 16, into sectors which form separate vertical parallel passages, each of gradually increasing horizontal cross-sectional area extending from the level of the lower end 17 of tube 16 to the level of decanting lip 11. Plates 23 may be welded in place, or attached to shell 9 and tube 16 by any other suitable known structural joint.

At the upper (leading) end of screw 21 is a reversed plow, baffle, or fin 26, which may be merely a down-turned leading edge on the screw blade 21 serving a purpose to be described hereinbelow.

It will be understood that the desired products are, a liquid mixture of solvent fluid with extracted substances, which liquid mixture or fluid solution will rise through the column and overflow lip 11 into trough 12, passing out through fitting 13, and spent solids which will pass from the bottom plate 2 through discharge conveyor housing 3 to a point of spent solids collection. And it is, of course, desirable that the product in the form of a fluid solution should, ideally, be perfectly free of solid particles. The comminuted solids which form the raw feed will, however, contain a certain amount of fines, and may be degraded or broken up somewhat by soaking, dissolution and agitation in the column, and the finer particles will tend to be carried upward by the current of solvent fluid. The use of strainers or filters within the column head is undesirable, because the strainers or filters tend to become clogged or blinded by fine particles.

The present invention employs the settling principle to rid the fluid solution of finely divided solids before discharge from the column, as follows: The relative sizes and forms of section 9 of the shell and tapering feed tube 16 are so chosen that the horizontal cross-sectional area of the annular space 24 between the exterior of tube 16 and the inner surface of shell section 9 at the level of tube end 17 is, preferably, at least equal to the internal area of shell section 1, and is substantially greater than the smaller area of openings 6' of plates 6. From the level of tube end 17, the horizontal cross-sectional area of this space 24 gradually increases, and, at the level of lip 11, is substantially greater than at the feed level 17. Thus the linear upward velocity of the stream of fluid solution, a maximum at top opening 6', gradually decreases as the fluid solution passes upwardly toward lip 11. Since level 17 is substantially below the level of lip 11, an appreciable time is allowed for flow of fluid solution through a settling space 24, during which time a large of the fine solids entrained by the fluid stream will flocculate and settle downwardly and tend to become entrained by the downwardly moving solids in the column and be carried on downwardly with the larger particles of solid material.

The central or coaxial feed tube 16, having its discharge end 17 substantially below the settling zone 24, provides a space in which the dry raw materials can be mixed with the solvent fluid in the column and largely freed of air or vapors before being set free to fall by gravity in the rising column of solvent fluid. This provides for elimination of air and vapors and avoids floating of particles by entrained air, such as might occur without effective mixing, or by mixing in or below the settling zone without means such as the tubular member 16 to prevent direct flow or floating upward to the discharge point.

The baffle plates 23 prevent swirling and turbulence in the settling zone, and promote quiescent stream flow, with decreasing velocity, which is a desirable condition for settling in a moving fluid.

Materials (raw solid particles) are preferably charged into tube 16 through fitting 19, initially at a rate greater than the capacity of the lower turns of screw 21. Reverse plow or baffle 26 restricts the intake of screw 21 to a quantity less than the volumetric capacity per turn of the screw. Thus, materials are charged in faster than the screw 21 can take them and the space above screw 21 will become filled with raw materials; that is, the screw 21 will be "choke fed." Yet, due to the fact that the volumetric capacity of the screw per turn is greater than the amount of solids allowed by the baffle 26 to enter, per turn of the screw, the screw 21 will never become quite full, and there will be space within its turns to permit free mixing of the solids with the solvent fluid which is permitted to enter the tube from below. The air and vapors are retained in the space within tube 16 above the leading end of screw 21. The mass of dry material above screw blade 21 will form a species of internal seal, preventing free flow of solvent fluid vapors out of fitting 19, and thus will contribute to the safety of operation when employing an inflammable solvent, and will help prevent escape of solvent fluid vapors of any type through fitting 19. Screw 21 will, of course, be rotated by shaft 7' in a direction to continuously feed solids downwardly, forcing them below the liquid surface and to the lower end 17 of feed tube 16.

The specific embodiment of the invention illustrated in the drawings and described herein is by way of example, and the invention is intended to include such modifications and equivalents as may occur to persons skilled in the art to which it appertains within the scope of the appended claims.

It is claimed and desired to secure by Letters Patent:

1. A continuous countercurrent extraction column comprising a substantially vertical main shell, means at the foot of said main shell for discharging solids and admitting liquids, a shell extension joined peripherally with the top of said main shell and extending upwardly with gradually increasing horizontal cross-sectional area and having its upper edge in a substantially horizontal plane to form a lip establishing a decanting level for liquids, a liquid receiving trough connected with said shell extension and surrounding said lip in liquid catching relation, means associated with said trough for conducting liquids from said trough, housing means connected with and enclosing the space above said trough and shell extension and including a tubular portion extending downwardly into said shell extension from above said liquid decanting level substantially to the level of the lower end of said shell extension, said tubular portion being of such form and dimensions that the space between its external surface and the internal surface of said shell extension is of gradually increasing horizontal cross-sectional area from the level of the lower end of said tubular portion to the liquid decanting level established by said lip, and means for feeding solid materials into said tubular portion of said housing means at a level above said liquid decanting level.

2. The combination of claim 1 with vertical radial baffle plates connecting said tubular portion of said housing means with said shell extension and extending from below to above said liquid decanting level to inhibit turbulent flow and promote quiescent upward flow of liquids at gradually decreasing linear velocities to the level of said lip through the space between said tubular portion and said shell extension.

3. The combination of claim 1 in which said form and relative dimensions of said shell extension and the lower end of said tubular portion of said housing means are such that the horizontal cross-sectional area of the space therebetween at the level of said lower end is at least as great as the horizontal cross-sectional area of said main shell at its upper end.

4. In a vertical countercurrent solvent extraction column having a generally vertical cylindrical shell provided at its lower end with means for introduction of liquid solvent and for removal of spent solids, the improvement comprising, an upper shell section of enlarged cross-section with its upper edge in a horizontal plane, said edge forming a peripheral lip, a liquid receiving trough connected with and surrounding said lip, a solids feeding tube of smaller diameter than said enlarged upper shell section associated with and extending downwardly from above the level of said lip into said enlarged upper shell section in coaxial relation thereto, and baffles extending axially in the annular space between said tube and said enlarged upper shell section substantially throughout the length of said space to inhibit swirling and turbulence in said space.

5. In a solids feeding and liquid removal unit for a solvent extraction device in which solid particles are intended to move downwardly by gravity countercurrent to an upward flow of solvent liquid, a shell zone of upwardly gradually increasing horizontal cross-sectional area, liquid removal means associated with said shell zone and establishing an operative liquid outflow level near the top of said shell zone, a feeding tube operatively connected with and extending downwardly into said shell zone from above said level and having an external form so related to the internal form of said shell zone that the differences in horizontal cross-sectional areas of said shell and said tube increase gradually from the level of the lower end of said tube upwardly to said operative liquid outflow level.

6. A solids feeding and liquid extract decanting unit for the upper end of a vertical countercurrent solvent extraction column, comprising a frusto-conical upper shell section for said column having its smaller diameter end downward and its upper and larger diameter end forming a horizontal liquid decanting lip, vertical baffle plates extending inwardly from the inner surface of said upper shell section a coaxial solids feeding tube within said shell section connected therewith and supported by said baffle plates and extending upwardly beyond the level of said decanting lip, the horizontal cross-sectional areas of the annular space between said solids feeding tube and said upper shell section increasing gradually from a minimum at the level of the lower end of said solids feeding tube to a maximum in the direction of the level of said decanting lip.

7. In a feeding device for solvent extraction units having a countercurrent extraction column through which solids move downwardly countercurrent to the upward flow of liquids to a liquid removal level, a feeding tube associated with and extending downwardly into said column from above and opening below said liquid level, a continuous conveyor screw arranged in and operative in close fitting relation in said feed tube and extending from above to below said liquid level for feeding solid materials downwardly through said tube, and a short reversed screw flight at the leading end of said screw reducing the effective material admitting area thereof to restrict the admission of materials at the leading end of said conveyor screw above the said liquid level to a per turn volume less than the per turn capacity of the said conveyor screw below said liquid level.

GUY V. WOODY.
CHARLES W. BILBE.

REFERENCES CITED

The following references are of record in the file of this patent:

UNITED STATES PATENTS

| Number | Name | Date |
|---|---|---|
| 1,055,475 | Koolman et al. | Mar. 11, 1913 |
| 1,146,783 | Carman | July 20, 1915 |
| 1,545,814 | Diers | July 14, 1925 |
| 1,689,159 | Shepard | Oct. 23, 1928 |
| 1,793,465 | Coahran | Feb. 24, 1931 |
| 2,042,818 | Allen et al. | June 2, 1936 |
| 2,158,782 | Bonotto | May 16, 1939 |